United States Patent
Chou et al.

(10) Patent No.: US 11,314,002 B2
(45) Date of Patent: Apr. 26, 2022

(54) WAVELENGTH TUNABLE BIDIRECTIONAL OPTICAL WIRELESS COMMUNICATION SYSTEM BASED ON SELF-INJECTION LOCK

(71) Applicant: NATIONAL TAIWAN UNIVERSITY OF SCIENCE AND TECHNOLOGY, Taipei (TW)

(72) Inventors: Hsi-Hsir Chou, Taipei (TW); Wei-Ta Huang, Taipei (TW)

(73) Assignee: NATIONAL TAIWAN UNIVERSIT OF SCIENCE AND TECHNOLOG, Taipei (TW)

( * ) Notice: Subject to any disclaimer, the term of this patent is extended or adjusted under 35 U.S.C. 154(b) by 0 days.

(21) Appl. No.: 17/217,539

(22) Filed: Mar. 30, 2021

(65) Prior Publication Data
US 2021/0302631 A1 Sep. 30, 2021

(30) Foreign Application Priority Data

Mar. 30, 2020 (TW) .................................. 109110846

(51) Int. Cl.
| | | |
|---|---|---|
| H04B 10/00 | (2013.01) | |
| G02B 5/20 | (2006.01) | |
| H04B 10/40 | (2013.01) | |
| G02B 27/14 | (2006.01) | |
| G02B 5/12 | (2006.01) | |

(52) U.S. Cl.
CPC .............. *G02B 5/20* (2013.01); *G02B 27/14* (2013.01); *H04B 10/40* (2013.01); *G02B 5/12* (2013.01)

(58) Field of Classification Search
CPC .. H04B 10/40; H04B 10/112; H04B 10/1123; H04B 10/1125; H04B 10/114; H04B 10/1143; H04B 10/1149; H04B 10/116; H04B 10/2587; G02B 5/20; G02B 27/14; G02B 27/141
USPC ....... 398/118, 119, 120, 121, 124, 125, 126, 398/127, 128, 129, 130, 131, 135, 136, 398/158, 159, 169, 170, 183, 172, 138, 398/140
See application file for complete search history.

(56) References Cited

U.S. PATENT DOCUMENTS

| | | | | |
|---|---|---|---|---|
| 8,027,591 B2 * | 9/2011 | Maryfield | ............... | G02F 1/017 398/107 |
| 8,160,454 B2 * | 4/2012 | Shimada | ................ | H04B 10/11 398/172 |
| 9,203,513 B2 * | 12/2015 | Winker | .............. | H04B 10/1125 |

* cited by examiner

*Primary Examiner* — Hanh Phan
(74) *Attorney, Agent, or Firm* — Chun-Ming Shih; Lanway IPR Services

(57) ABSTRACT

A wavelength tunable bidirectional optical wireless communication system based on self-injection lock includes one optical node and multiple optical terminals, wherein the optical node consists of a tunable filter and a self-injection lock system to replace the conventional optical amplifier while achieving an amplified optical power, increasing the modulation bandwidth, wavelength adjustment and reducing the linewidth of each wavelength, in a low noise criteria. The optical terminal is composed by a modulated retroreflector to achieve the purpose of lightweight and low power consumption.

7 Claims, 2 Drawing Sheets

WAVELENGTH TUNABLE BIDIRECTIONAL OPTICAL WIRELESS COMMUNICATION SYSTEM BASED ON SELF-INJECTION LOCK

CROSSED-REFERENCE TO RELATED APPLICATION

This application claims priority to and the benefit of Taiwan Patent Application No. 109110846, filed on Mar. 30, 2020, in the Taiwan Intellectual Property Office, the entire content of which is incorporated herein by reference.

BACKGROUND OF THE INVENTION

1. Field of the Invention

The present invention is related to a wavelength tunable bidirectional optical wireless communication system based on self-injection lock, in particular to a bidirectional optical wireless communication system capable of realizing wavelength tunability based on the self-injection lock and a tunable bandpass filter.

2. Description of the Prior Art

The development of optical wireless communication technology originates from the technologies and ideas proposed to support some areas where it is difficult to install optical fibers and have optical fiber broadband networks. That is, there is no need to use wired media such as optical fibers and cables as the communication media. Therefore, it is also called Free Space Optical Wireless Communication (FSOWC).

The propagation characteristics of light sources with different wavelength bands transmitted in the transmission channel are not the same. Therefore, it is necessary to select suitable light sources based on different applications and occasions. The selected light sources can be simply sorted into two categories (visible light wireless communication system and invisible light wireless communication system) by their wavelength characteristics.

The conventional free space optical wireless communication architecture, which includes an optical node and an optical terminal, is a symmetrical architecture. That is, there are light sources, collimation systems, modulators, receivers and power supplies at both ends so that problems such as optical collimation, huge system, energy consumption and high cost will arise.

In order to solve the above problems, a Modulated Retroreflector (MRR) has been developed to replace the transmitter and collimation system of the optical terminal. The working principle of the modulated retroreflector is that the optical node transmits an unmodulated light to the optical terminal, and then the light is modulated and reflected to the optical node parallel to the original incident light path when the MRR at the optical terminal receives the light. Due to the advantages of lightweight and low power consumption of MRR, it can be used for communications between underwater stations and unmanned underwater vehicles (UUV) or divers, terrestrial base stations and small unmanned aerial vehicles (UAV), small low-earth orbits (LEO), and remote mountainous areas.

Generally, there is no light resource because the MRR Link is at the optical terminal and the transmission distance of the MRR Link is twice that of the conventional FSOWC link. The transmission loss of the MRR Link is proportion to $1/R^4$. Therefore, the optical power attenuation in the data return leads to decrease of signal-to-noise ratio (SNR).

In order to avoid excessive attenuation of optical power leading to low SNR and reduction of transmission distance, optical amplifier such as Erbium-doped Optical Fiber Amplifier (EDFA) or Semiconductor Optical Amplifier (SOA) will be added at the optical node in the conventional MRR Link to amplify optical signals, but they also increase noise and energy consumption at the same time.

In addition, the conventional MRR optical terminal utilize a corner cube retroreflector as a passive retroreflector. Although it has a high field of view (FOV), its aperture size limits the switching speed, energy consumption and cost of the modulator.

Therefore, in order to overcome the aforementioned problem, the present invention combines and utilizes the self-injection locking (SIL) technology at the optical node and the optical terminal uses multiple lenses and passive retroreflectors to achieve the FSOWC with low energy consumption and high SNR. The advantage of SIL includes the increase of transmission power and modulation bandwidth, reduction of spectral linewidth and less energy consumption compared to the EDFA/SOA. Therefore, the present invention should be the best solution.

SUMMARY OF THE INVENTION

The present invention provides a wavelength tunable bidirectional optical wireless communication system based on self-injection lock, comprising: an optical node comprising: an optical transceiver capable of transmitting a set of unmodulated incident light beams, wherein the unmodulated incident light beams have specific wavelength range; a tunable bandpass filter arranged on the path of the incident light beams for the specific wavelength range in the incident light beams to pass through; a reflector arranged on the path of the incident light beams; and a beamsplitter arranged on the path of the incident light beams to split the incident light beams which pass through the tunable bandpass filter into a first split beam and a second split beam, wherein the first split beam passes through the beamsplitter and heads to the reflector, and the reflector reflects light beams to the beamsplitter which splits the reflected light beams into a third split beam and a fourth split beam, wherein the third split beam passes through the beamsplitter and injects into the optical transceiver and the fourth split beam heads to an optical receiver and is received by the optical receiver; and an optical terminal comprising: a passive retroreflector for passively reflecting incident light parallel to path of original incident light; and an optical modulator arranged on one side of the passive retroreflector, wherein the optical modulator outputs a reversing light beam with signal after the second split beam passes through the passive retroreflector and enters the optical modulator, then the reversing light beam passes through the passive retroreflector and is parallel to the path of the second split beam, so that the reversing light beam is reflected to the optical node and received by the optical receiver.

More specifically, there is a collimator between the optical transceiver and the tunable bandpass filter to enable the path of the incident light beams transmitted from the optical transceiver to travel in parallel.

More specifically, there is a polarizer between the optical transceiver and the tunable bandpass filter to control the polarization direction of the incident light beams transmitted from the optical transceiver.

More specifically, the reflector is a high reflectivity mirror.

More specifically, the optical modulator is a multiple quantum well modulator, a Liquid Crystal Spatial Light Modulator (LC-SLM), a Liquid Crystal on Silicon Spatial Light Modulator (LCoS-SLM), a microelectromechanical system spatial light modulator or a Lithium Niobate Electro-Optics Modulator.

More specifically, the passive retroreflector is a cat-eye lens group or a corner cube retroreflector.

More specifically, the reversing light beam enters the beamsplitter and is split into a fifth split beam and a sixth split beam, the fifth split beam passes through the beamsplitter and is injected into the optical receiver, and the sixth split beam is directed towards the optical transceiver by the beamsplitter.

DETAILED DESCRIPTION OF THE PREFERRED EMBODIMENT

Other technical contents, aspects and effects in relation to the present invention can be clearly appreciated through the detailed descriptions concerning the preferred embodiments of the present invention in conjunction with the appended drawings.

Figure 1:
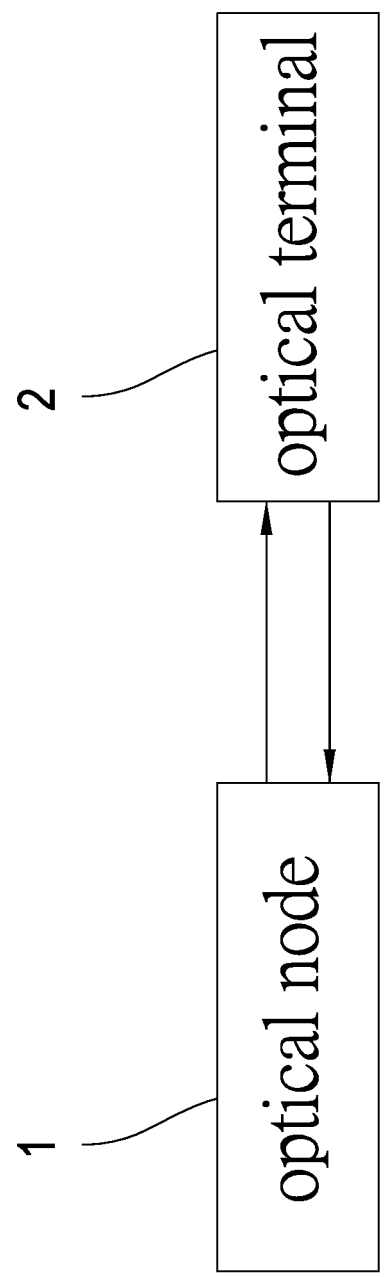
FIG. 1 is a schematic diagram of the overall framework of the wavelength tunable bidirectional optical wireless communication system based on self-injection lock of the present invention.
Figure 2:
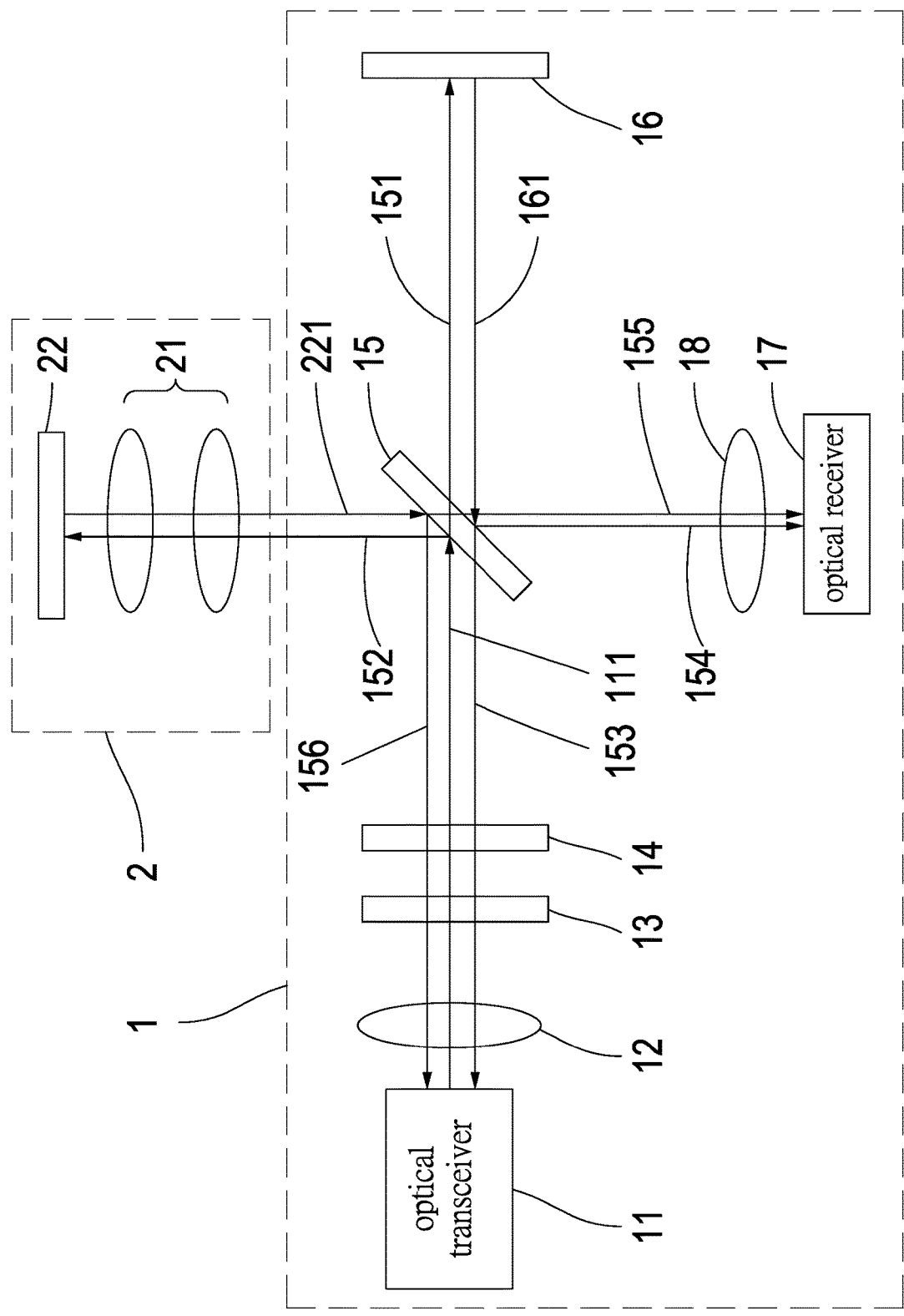
FIG. 2 is a realistic schematic diagram of the wavelength tunable bidirectional optical wireless communication system based on self-injection lock of the present invention.

As shown in FIG. 1 and FIG. 2, the wavelength tunable bidirectional optical wireless communication system based on self-injection lock of the present invention comprises an optical node 1 and an optical terminal 2, wherein the optical node 1 comprises:

(1) an optical transceiver 11 capable of transmitting a set of unmodulated incident light beams 111, wherein the incident light beams 111 have specific wavelength range. In this embodiment of the present invention, the optical transceiver 11 utilizes wideband laser such as Fabry-Pérot Laser Diode (FP-LD). The laser source of the optical transceiver 11 may be served as the master laser and the slave laser simultaneously. The transmitted laser is self-injected to the original laser after reflection to amplify and re-transmit the light.

(2) a collimator 12 is used to enable the path of the incident light beams 111 transmitted from the transceiver 11 to travel in parallel.

(3) a polarizer 13 is used to control the polarization direction of the incident light beams 111 transmitted from the optical transceiver 11.

(4) a tunable bandpass filter 14 is used to filter the incident light beams 111 for the specific wavelength range in the incident light beams 111 to pass through.

(5) a reflector 16 is arranged on the path of the incident light beams 111, wherein the reflector 16 is a high reflectivity mirror.

(6) a beamsplitter 15 is arranged on the path of the incident light beams 111 to allow the incident light beams 111 which pass through the tunable bandpass filter 14 to split into different paths. The path description is as follows:

(a) After the incident light beams 111 contact the beamsplitter 15, the incident light beams 111 are split into a first split beam 151 and a second split beam 152, wherein the first light beam 151 can pass through the beamsplitter 15 and direct to the reflector 16.

(b) The reflector 16 can reflect the light beams 161 to the beamsplitter 15, and the light beams 161 are then split into a third split beam 153 and a fourth split beam 154. The third split beam 153 passes through the beamsplitter 15 and is injected into the optical transceiver 11. The fourth split beam 154 heads to the optical receiver 17 and is received by the optical receiver 17. Furthermore, there is a lens 18 between the beamsplitter 15 and the optical receiver 17.

The optical terminal 2 comprises:

(1) a passive retroreflector 21 is used to passively reflect the incident light parallel to the original incident light path. In this embodiment of the present invention, the passive retroreflector 21 is a cat-eye system (also called a cat-eye lens group) or a corner cube retroreflector.

(2) an optical modulator 22 is arranged on one side of the passive retroreflector 21. The optical modulator 22 is a multiple quantum well modulator (MQW), a Liquid Crystal Spatial Light Modulator (LC-SLM), a Liquid Crystal on Silicon Spatial Light Modulator (LCoS-SLM), a microelectromechanical system (MEMS) spatial light modulator or a Lithium Niobate Electro-Optics Modulator, wherein the optical path through the optical modulator 22 is described as follows:

(a) After the second split beam 152 passes through the passive retroreflector 21 and enters the optical modulator 22, the optical modulator 22 can modulate a reversing light beam 221 with signal, and then the reversing light beam 221 passes through the passive retroreflector 21 and is parallel to the path of the second split beam 152, so that the reversing light beam 221 is returned to the optical node 1 and received by the optical receiver 17.

(b) After the reversing light beam 221 enters the beamsplitter 15 and is split into a fifth split beam 155 and a sixth split beam 156. The fifth split beam 155 passes through the beamsplitter 15 and is injected into the optical receiver 17, and the sixth split beam 156 is directed towards the optical transceiver 11 by the beamsplitter 15.

As described above, the present invention intends to utilize a broadband laser such as Fabry-Pérot laser (FP-LD) at the optical node 1 in combination with a tunable bandpass filter 14 and SIL to replace the convention optical amplifier. At the same time, the objectives of amplifying the optical power, increasing the modulation bandwidth, reducing the line width, low noise and adjustable wavelength are achieved.

The advantages of SIL are reduction of linewidth, enhancement of the frequency response, increase of modulation bandwidth, reduction of relative intensity noise (RIN) and nonlinear distortion, and improvement of link gain. It is different from the general free-running laser, SIL has two important parameters. One is the external injection ratio which is defined as:

$$R_{inj} = k_c \frac{A_{inj}}{A_{fr}} \quad \text{Formula (1)}$$

wherein $k_c$ is a coupling coefficient, $A_{fr}$ is a steady state field magnitude of the free-running slave laser, $A_{inj}$ is the injection field magnitude of the injected master laser. Since the optical power is proportional to the square of the field intensity ($P \propto A^2$), the formula (1) can be rewritten as dB form for the convenience of measurement.

$$R_{inj} = \frac{P_{inj}}{P_{fr}} \quad \text{Formula (2)}$$

Another important parameter is the detuning frequency, which is usually expressed as frequency detuning (GHz) or wavelength detuning (pm) and defined as:

$$\Delta\omega = \omega_{master} - \omega_{slave} \quad \text{Formula (3)}$$

Wherein $\omega_{master}$ is the frequency of the master laser, and $\omega_{slave}$ is the frequency of the slave laser. The direct modulation of the slave laser is not symmetrical. Therefore, the positive or negative value of the detuning frequency has different influence on the slave laser. Negative detuning frequency can achieve stable injection locking. On the contrary, positive detuning frequency usually leads to more complicated dynamic work, such as P1 dynamic state. The small modulation response of the injection locking and each parameter can be derived from the rate equation formula (4) to formula (6) as follows:

$$\frac{dA(t)}{dt} = \frac{1}{2}\Gamma g A(t) - \frac{1}{2}\gamma_c A(t) + K_c A_{inj} \cos(\phi(t)) \quad \text{Formula (4)}$$

$$\frac{d\phi(t)}{dt} = \frac{\alpha}{2}\Gamma g - \frac{\alpha}{2}\gamma_c - \Delta\omega - k_c \frac{A_{inj}}{A(t)} \sin(\phi(t)) \quad \text{Formula (5)}$$

$$\frac{dN(t)}{dt} = J(t) - \gamma_s N(t) - g A^2(t) \quad \text{Formula (6)}$$

Wherein A(t) and N(t) are the electrical field intensity and the carrier density of the slave laser respectively, $\phi(t)$ is the phase difference between the master laser and the slave laser, a is the linewidth gain parameter of the slave laser, J(t) is the bias current density, $\gamma_s$ is the spontaneous carrier relaxation rate, $\gamma_c$ is the intra-cavity photon attenuation rate and defined as formula (7), $\tau_p$ is the photon lifetime, $\Gamma$ is the optical confinement factor, g is the gain constant and $g_{th}$ is the threshold gain.

$$\gamma_c = \Gamma g_{th} = \frac{1}{\tau_p} \quad \text{Formula (7)}$$

Formula (8) to Formula (10) can be derived from Formula (4) to Formula (6):

$$S_0 = \frac{s_{fr} - \left(\frac{\gamma_N}{\gamma_p}\right)\Delta N_0}{1 + \left(\frac{g\Delta N_0}{\gamma_p}\right)} \quad \text{Formula (8)}$$

$$\phi_0 = \sin^{-1}\left(-\frac{\Delta\omega_{inj}}{k_c\sqrt{1+\alpha^2}}\sqrt{\frac{S_0}{S_{inj}}}\right) - \tan^{-1}\alpha \quad \text{Formula (9)}$$

$$\Delta N_0 = -\frac{2k}{g}\sqrt{\frac{S_{inj}}{S_0}}\cos\phi_0 \quad \text{Formula (10)}$$

Wherein $S_0$ is the optimizing steady state photon density under injection locking, $\Delta N_0 \equiv N_0 - N_{th}$ is the carrier density variation, $N_0$ is the optimizing steady state carrier density under injection locking, $N_{th}$ is the steady state carrier density under free running condition, and the resonant frequency $\omega_R$ can be written as:

$$\omega_R^2 \approx \omega_{R0}^2 + \Delta\omega_R^2 = \left|-\frac{\alpha}{2}g(N_0 - N_{th}) + \Delta\omega\right| \quad \text{Formula (11)}$$

$$\Delta\omega_R \equiv \left|k_c\sqrt{\frac{S_{inj}}{S_0}}\sin(\phi_0)\right| \quad \text{Formula (12)}$$

Wherein $\omega_{R0}$ is the relaxation oscillation frequency of the free running laser, $\Delta\omega_R^2$ is the frequency enhancement term. The SIL improves the modulation bandwidth has been proved and verified by the experiments. The curve can be obtained by analyzing the poles of the direct modulation frequency response intensity, and the poles can also be derived from the frequency response.

$$H(\omega) = \frac{ZM}{(j\omega + \omega_p)\left(j\omega - j\omega_R + \frac{1}{2}\gamma\right)\left(j\omega + j\omega_R + \frac{1}{2}\gamma\right)} \quad \text{Formula (13)}$$

$$\gamma \approx \gamma_0 - g(N_0 - N_{th}) = \gamma_0 + 2k\sqrt{\frac{S_{inj}}{S_0}}\cos(\phi_0) \quad \text{Formula (14)}$$

Wherein $\gamma$ is the damping ratio, the first pole of the frequency response $-\omega_p$ determines the response of the low pass filter, which affects the 3-dB frequency response. External resonant cavity is the distance from LD to the high reflectivity mirror. In formula (15), $\Delta\lambda$ is the wavelength interval in FP mode, $\lambda_c$ is the central wavelength of FP-LD, n is the medium of the external resonant cavity, $L_{ext}$ is the length of the external resonant cavity. We can conclude that the distance of the external resonant cavity has an effect on the modulation bandwidth, linewidth and wavelength interval in FP mode.

$$\Delta\lambda = \frac{\lambda_c^2}{2nL_{ext}} \quad \text{Formula (15)}$$

As mentioned above, the present invention uses the cat-eye system as the embodiment of the passive retroreflector 21, wherein the cat-eye system is composed of multiple lens and a mirror to allow the reflected light parallel to the original incident light passively. Its important parameters are front-end optical gain, FOV, modulation efficiency, modulator radius, and theoretical optical signal-to-noise ratio, which can be derived from formula (16) to formula (20) respectively:

$$G_{MRR} = \left[\frac{\pi D_{retro}}{\lambda}\right]^4 S \quad \text{Formula (16)}$$

$$AFOV(°) = 2 \times \tan^{-1}\left(\frac{h}{2f}\right) \quad \text{Formula (17)}$$

$$M = e^{-\alpha_{On}} - e^{-\alpha_{Off}} = e^{-\alpha_{Off}} \cdot [C_{mod} - 1] \quad \text{Formula (18)}$$

$$D_{mod} = f\#D_{retro}FOV_{retro} \quad \text{Formula (19)}$$

$$OSNR = \frac{MP_{Ret}}{P_{noise}} \quad \text{Formula (20)}$$

Wherein $D_{retro}$ is the optical aperture, S is Strehl ratio, h is the modulator diameter, f is the focal length of the cat-eye system, $\alpha_{On}$ and $\alpha_{Off}$ are double-pass absorption-length product of the modulator when it is on and off, $C_{mod}$ is the optical contrast of the modulator and $P_{noise}$ is the noise equivalent power of the photodetector.

Compared with other conventional technologies, the wavelength tunable bidirectional optical wireless communication system based on self-injection lock provided in the present invention has the advantage of combining self-injection locking (SIL) technique at the optical node 1 and achieving the FSOWC with low energy consumption and high SNR through multiple lenses and passive retroreflectors 21. The advantages of SIL include not only increasing the transmission power and modulation bandwidth, but also reducing the spectral linewidth and consuming less energy than EDFA/SOA. At the same time, the purpose of low cost and flexible wavelength can be achieved by Fabry-Pérot laser and tunable bandpass filter 14.

Although the present invention has been disclosed through the aforementioned embodiments, such illustrations are by no means used to restrict the scope of the present invention. That is, any person having ordinary skill in relevant fields of the present invention can certainly devise any applicable alterations and modifications after having comprehended the aforementioned technical characteristics and embodiments of the present invention within the spirit and scope thereof. Hence, the scope of the present invention to be protected under patent laws should be delineated in accordance with the claims set forth hereunder in the present specification.

What is claimed is:

1. A wavelength tunable bidirectional optical wireless communication system based on self-injection lock, comprising:
    an optical node, comprising:
        an optical transceiver capable of transmitting a set of unmodulated incident light beams, wherein the unmodulated incident light beams have specific wavelength range;
        a tunable bandpass filter arranged on the path of the incident light beams for the specific wavelength range in the incident light beams to pass through;
        a reflector arranged on the path of the incident light beams; and
        a beamsplitter arranged on the path of the incident light beams to split the incident light beams which pass through the tunable bandpass filter into a first split beam and a second split beam, wherein the first split beam passes through the beamsplitter and heads to the reflector, and the reflector reflects light beams to the beamsplitter which splits reflected light beams into a third split beam and a fourth split beam, wherein the third split beam passes through the beamsplitter and injects into the optical transceiver and the fourth split beam heads to an optical receiver and is received by the optical receiver; and
    an optical terminal, comprising:
        a passive retroreflector for passively reflecting incident light parallel to path of original incident light; and
        an optical modulator arranged on one side of the passive retroreflector, wherein the optical modulator outputs a reversing light beam with signal after the second split beam passes through the passive retroreflector and enters the optical modulator, then the reversing light beam passes through the passive retroreflector and is parallel to the path of the second split beam, so that the reversing light beam is reflected to the optical node and received by the optical receiver.

2. The optical wireless communication system of claim 1, wherein there is a collimator between the optical transceiver and the tunable bandpass filter to enable the path of the incident light beams transmitted from the optical transceiver to travel in parallel.

3. The optical wireless communication system of claim 1, wherein there is a polarizer between the optical transceiver and the tunable bandpass filter to control the polarization direction of the incident light beams transmitted from the optical transceiver.

4. The optical wireless communication system of claim 1, wherein the reflector is a high reflectivity mirror.

5. The optical wireless communication system of claim 1, wherein the optical modulator is a multiple quantum well modulator, a Liquid Crystal Spatial Light Modulator (LC-SLM), a Liquid Crystal on Silicon Spatial Light Modulator (LCoS-SLM), a microelectromechanical system spatial light modulator or a Lithium Niobate Electro-Optics Modulator.

6. The optical wireless communication system of claim 1, wherein the passive retroreflector is a cat-eye lens group or a corner cube retroreflector.

7. The optical wireless communication system of claim 1, wherein the reversing light beam enters the beamsplitter and is split into a fifth split beam and a sixth split beam, the fifth split beam passes through the beamsplitter and is injected into the optical receiver, and the sixth split beam is directed towards the optical transceiver by the beamsplitter.

* * * * *